US012522190B2

(12) United States Patent
Seo et al.

(10) Patent No.: US 12,522,190 B2
(45) Date of Patent: Jan. 13, 2026

(54) ELECTRIC BRAKE SYSTEM

(71) Applicant: HL MANDO CORPORATION, Gyeonggi-do (KR)

(72) Inventors: Dongil Seo, Gyeonggi-do (KR); Inwook Jeon, Gyeonggi-do (KR); Kiwon Kang, Gyeonggi-do (KR); Yeonseong Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/810,516

(22) Filed: Aug. 21, 2024

(65) Prior Publication Data

US 2025/0319855 A1  Oct. 16, 2025

(30) Foreign Application Priority Data

Apr. 12, 2024  (KR) .................. 10-2024-0049533

(51) Int. Cl.
*B60T 13/68* (2006.01)
*B60T 13/66* (2006.01)
*B60T 13/74* (2006.01)

(52) U.S. Cl.
CPC .......... *B60T 13/686* (2013.01); *B60T 13/662* (2013.01); *B60T 13/745* (2013.01)

(58) Field of Classification Search
CPC ..... B60T 13/686; B60T 13/662; B60T 13/745
See application file for complete search history.

(56) References Cited

U.S. PATENT DOCUMENTS

| | | | | |
|---|---|---|---|---|
| 6,135,572 | A * | 10/2000 | Worsdorfer | B60T 13/16 303/10 |
| 2011/0006594 | A1* | 1/2011 | Ganzel | B60T 8/3655 303/10 |
| 2013/0241273 | A1* | 9/2013 | Kim | B60T 13/142 303/6.01 |
| 2019/0329749 | A1* | 10/2019 | Jeong | B60T 13/662 |
| 2022/0176930 | A1* | 6/2022 | Kim | B60T 11/165 |

FOREIGN PATENT DOCUMENTS

| KR | 10-2014-0002706 | 1/2014 |
|---|---|---|
| KR | 10-2023-0133072 | 9/2023 |

* cited by examiner

*Primary Examiner* — Sizo B Vilakazi
(74) *Attorney, Agent, or Firm* — WOMBLE BOND DICKINSON (US) LLP

(57) ABSTRACT

Disclosed is an electric brake system. The disclosed electric brake system includes: a reservoir; an integrated master cylinder including a master piston, a master chamber, and a pedal simulator; a liquid pressure supply device; a first hydraulic circuit controlling a flow of a pressurized medium supplied to a first wheel cylinder and a second wheel cylinder; a second hydraulic circuit controlling a flow of a pressurized medium supplied to a third wheel cylinder and a fourth wheel cylinder; a single backup path of which one end is connected to the master chamber, and the other end is connected to any one of the first and second hydraulic circuits; a cut valve provided in the backup path; and a connection path connecting the first hydraulic circuit and the second hydraulic circuit, and the connection path and the other end of the backup path are in communication with each other.

20 Claims, 6 Drawing Sheets

ELECTRIC BRAKE SYSTEM

CROSS-REFERENCE TO RELATED APPLICATIONS

This application claims the priority of Korean Patent Application No. 10-2024-0049533 filed on Apr. 12, 2024, in the Korean Intellectual Property Office, the disclosure of which is incorporated herein by reference.

BACKGROUND

Field

The present disclosure relates to an electric brake system, and more particularly, to an electric brake system that generates braking force by using an electric signal corresponding to a displacement of a brake pedal.

Description of the Related Art

A brake system for performing braking is requisitely mounted on a vehicle, and various types of brake systems are proposed for the safety of drivers and passengers.

A brake system in related art primarily adopts a scheme of supplying liquid pressure required for braking to a wheel cylinder through a mechanically connected booster when the driver steps on a brake pedal. However, as the market demand for implementing various braking functions specifically in response to the operating environment of the vehicles increases, recently, an electric brake system for receiving a driver's braking will as an electric signal from a pedal displacement sensor for detecting a displacement of a brake pedal when the driver steps on the brake pedal and supplying the liquid pressure required for braking to the wheel cylinder by operating a liquid pressure supply device based thereon is becoming widely available. When such an electric brake system operates in a normal operation mode, the operation of the brake pedal by the driver or braking determination upon autonomous driving of a vehicle are generated and provided as electric signals, and based thereon, the liquid pressure supply device is electrically operated and controlled, so the liquid pressure required for braking is formed and transmitted to a wheel cylinder.

As such, although such an electric brake system and an operation method are electrically operated and controlled so that complex and various braking operations may be implemented, when a technical problem occurs in an electric component, the liquid pressure required for braking may not be stably generated, and thus the safety of passengers may not be secured.

Therefore, the electric brake system enters an abnormal operation mode when a component fails or becomes out of control, and in this case, a mechanism is required in which the operation of the brake pedal by a driver is directly linked to the wheel cylinders. That is, in the abnormal operation mode in the electric brake system, as the driver depresses the brake pedal, a liquid pressure required for braking needs to be generated immediately and transferred directly to the wheel cylinders.

Further, a method is required, in which the electric brake system can stably implement braking in the abnormal operation mode in addition to the normal operation mode, and at the same time, minimize components provided in the system, such as a hydraulic path and a hydraulic valve.

SUMMARY

An object to be achieved by the exemplary embodiment is to provide an electric brake system which may effectively implement braking even in various operation situations.

Another object to be achieved by the exemplary embodiment is to provide an electric brake system which may implement braking by a simple structure and a simple operation.

Yet another object to be achieved by the exemplary embodiment is to provide an electric brake system which may reduce noise generated upon braking by reducing the number of valves.

Still yet another object to be achieved by the exemplary embodiment is to provide an electric brake system which may reduce cost by reducing the number of components.

According to an aspect of the present disclosure, an electric brake system includes: a reservoir storing a pressurized medium; an integrated master cylinder including a master piston connected to a brake pedal, a master chamber of which a volume is varied by displacement of the master piston, and a pedal simulator providing a pedal feeling in contact with the master piston; a liquid pressure supply device generating a liquid pressure by operating a hydraulic piston by an electric signal output in response to the displacement of the brake pedal; a first hydraulic circuit controlling a flow of a pressurized medium supplied to a first wheel cylinder and a second wheel cylinder; a second hydraulic circuit controlling a flow of a pressurized medium supplied to a third wheel cylinder and a fourth wheel cylinder; a single backup path of which one end is connected to the master chamber, and the other end is connected to any one of the first and second hydraulic circuits; a cut valve provided in the backup path and controlling the flow of the pressurized medium; and a connection path connecting the first hydraulic circuit and the second hydraulic circuit to each other, and the connection path and the other end of the backup path are in communication with each other.

The connection path and the other end of the backup path may be in direct communication with each other without intervention of a valve.

The integrated master cylinder may include a first master piston connected to the brake pedal, a second master piston provided to be displaceable by a displacement of the first master piston, a first master chamber of which volume is varied by the displacement of the first master piston, and a second master chamber of which volume is varied by a displacement of the second master piston, and one end of the backup path may be connected to the second master chamber.

The pedal simulator may be provided between the first master piston and the second master piston.

The electric brake system may further include a hydraulic control device provided between the liquid pressure supply device, and the first and second hydraulic circuits, and controlling the flow of the pressurized medium, and each of the first hydraulic circuit and the second hydraulic circuit may include at least one inlet valve controlling a flow of a pressurized medium transmitted to at least any one of the first to fourth wheel cylinders, and the connection path may be provided between a rear end of the hydraulic control device and a front end of the inlet valve.

The liquid pressure supply device may include a first pressure chamber provided at a front side of the hydraulic piston, and a second pressure chamber provided at a rear side of the hydraulic piston, and the hydraulic control device may include a first hydraulic path connecting the first pressure chamber and the connection path, a second hydraulic path connecting the second pressure chamber and the connection path, a third hydraulic path of which one end is connected to the first hydraulic path and the other end is connected to the second hydraulic path, and a fourth hydraulic path connecting the third hydraulic path and the connection path.

The hydraulic control device may include a first valve provided in the first hydraulic path and controlling the flow of the pressurized medium, a second valve provided in the second hydraulic path and controlling the flow of the pressurized medium, a third valve provided in the third hydraulic path, and provided between one end and a connection point of the fourth hydraulic path, and a fourth valve provided in the third hydraulic path, and provided between the other end and a connection point of the fourth hydraulic path.

The first valve may be provided as a check valve that allows only the flow of the pressurized medium discharged from the first pressure chamber, the second valve may be provided as a check valve that allows only the flow of the pressurized medium discharged from the second pressure chamber, and the third valve and the fourth valve may be provided as a solenoid valve that controls a bidirectional flow of the pressurized medium.

The electric brake system may further include a first reservoir path connecting the reservoir and the second master chamber.

The first master chamber may be provided as a dry type in which the pressurized medium is not accommodated.

The electric brake system may further include a second reservoir path connecting the reservoir and the first master chamber.

The electric brake system may further include a sensor sensing a water level of the pressurized medium accommodated in the reservoir.

The electric brake system may further include a dump control unit provided between the reservoir and the liquid pressure supply device, and controlling the flow of the pressurized medium.

The dump control unit may include a first dump control unit controlling the flow of the pressurized medium between the first pressure chamber and the reservoir, and a second dump control unit controlling the flow of the pressurized medium between the second pressure chamber and the reservoir.

The first dump control unit may include a first dump path connecting the first pressure chamber and the reservoir, and a first bypass path branched, and then rejoined on the first dump path, and the second dump control unit may include a second dump path connecting the second pressure chamber and the reservoir, and a second bypass path branched, and then rejoined on the second dump path.

According to another aspect of the present disclosure, provided is an operation method of an electric brake system, in which a normal operation mode includes a first braking mode of primarily providing a liquid pressure, a second braking mode of secondarily providing the liquid pressure, and a third braking mode of tertiarily providing the liquid pressure, as the liquid pressure of the pressurized medium transmitted from the liquid pressure supply device to the wheel cylinder gradually increases.

The operation method of the electric brake system may be provided, in which in the first braking mode, the hydraulic piston moves forward to transmit the pressurized medium accommodated in the first pressure chamber to the first to fourth wheel cylinders.

The operation method of the electric brake system may be provided, in which in the second braking mode, the hydraulic piston moves backward to transmit the pressurized medium accommodated in the second pressure chamber to the first to fourth wheel cylinders.

The operation method of the electric brake system may be provided, in which in the third braking mode, the third valve and the fourth valve are opened, and the hydraulic piston moves forward again, and some pressurized medium of the first pressure chamber is transmitted to the first to fourth wheel cylinders, and the remaining pressurized medium of the first pressure chamber is transmitted to the second pressure chamber.

The operation method of the electric brake system may be provided, which further includes a fallback mode switched when braking by the liquid pressure supply device is impossible, in which in the fallback mode, the pressurized medium discharged from the integrated master cylinder is transmitted to all of the first to fourth wheel cylinders via the backup path and the connection path.

The exemplary embodiment provides an electric brake system which may effectively implement braking even in various operation situations.

The exemplary embodiment provides an electric brake system which may implement braking by a simple structure and a simple operation.

The exemplary embodiment provides an electric brake system which may reduce noise generated upon braking by reducing the number of valves.

The exemplary embodiment provides an electric brake system which may reduce cost by reducing the number of components.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
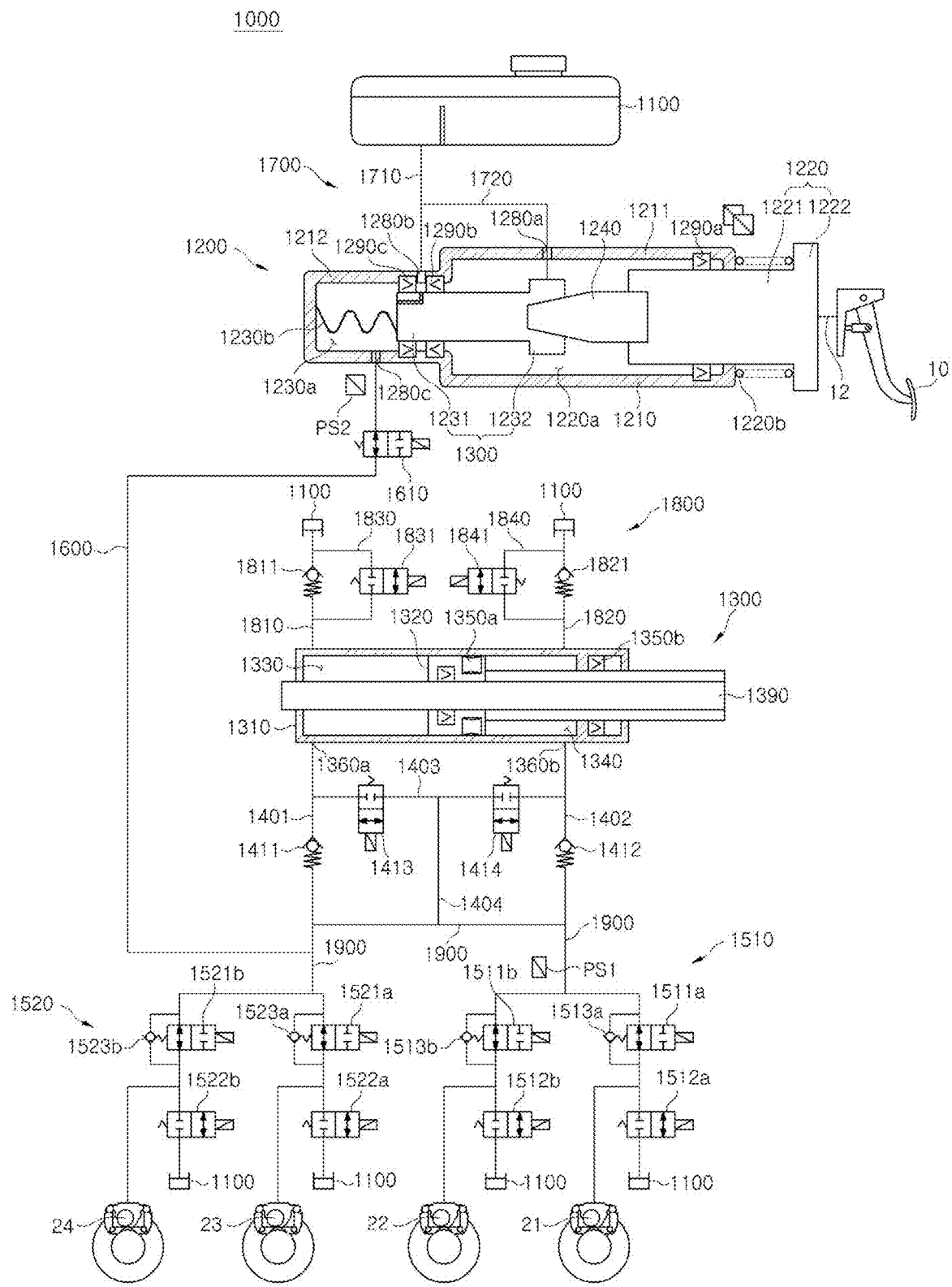
FIG. 1 is a hydraulic circuit diagram of an electric brake system according to a first exemplary embodiment of the present disclosure.

Hereinafter, the exemplary embodiment will be described in detail with reference to the accompanying drawings. The following exemplary embodiment is to present to sufficiently convey the idea of the present disclosure to those skilled in the art to which the present disclosure pertains. The present disclosure is not limited to exemplary embodiments presented herein and may be embodied in other forms. In the drawings, illustration of parts not related to the description to clarify the present disclosure, and the size of a component may be slightly exaggerated and expressed to help understanding.

FIG. 1 is a hydraulic circuit diagram of an electric brake system 1000 according to a first exemplary embodiment of the present disclosure.

Referring to FIG. 1, the electric brake system 1000 according to the first exemplary embodiment of the present disclosure includes a reservoir 1100 storing a pressurized medium, an integrated master cylinder 1200 providing a repulsive force according to a pedal effort of a brake pedal 10 to a driver, and at the same time, pressing and discharging a pressurized medium such as a brake oil accommodated therein, a liquid pressure supply device 1300 receiving a braking will of the driver by a pedal displacement sensor that senses a displacement of the brake pedal 10 as an electric signal, and generating a liquid pressure of the pressurized medium through a mechanical operation, a hydraulic control device 1400 controlling the liquid pressure provided by the liquid pressure supply device 1300, hydraulic circuits 1510 and 1520 including a wheel cylinder 20 performing braking of respective vehicle wheels RR, RL, FR, and FL as the liquid pressure of the pressurized medium is transmitted, a dump control unit 1800 provided between the liquid pressure supply device 1300 and the reservoir 1100, and controlling a flow of the pressurized medium, a backup path 1600 hydraulically connecting the integrated master cylinder 1200 and the hydraulic circuits 1510 and 1520, a reservoir path 1700 hydraulically connecting the reservoir 1100 and the integrated master cylinder 1200, and an electronic control unit (ECU) (not illustrated) controlling the liquid pressure supply device 1300 and various valves based on liquid pressure information and pedal displacement information.

When the driver applies the pedal effort to the brake pedal 10 for a braking operation, the integrated master cylinder 1200 is provided to provide a repulsive force against the stepping force to the driver to provide a stable pedal feeling, and at the same time, to press and discharge the pressurized medium accommodated therein by operating the brake pedal 10.

In the integrated master cylinder 1200, a simulation unit providing a pedal feeling to the driver, and a master cylinder unit that presses and discharges the pressurized medium accommodated therein by the pedal effort of the brake pedal may be disposed coaxially in one cylinder body 1210.

Specifically, the integrated master cylinder 1200 may include a cylinder body 1210 having a chamber therein, a first master chamber 1220a formed at an inlet of the cylinder body 1210 to which the brake pedal 10 is connected, a first master piston 1220 provided in the first master chamber 1220a and connected to the brake pedal 10, and provided to be displaced by the operation of the brake pedal 10, a second master chamber 1230a formed inside or at a front side of the first master chamber 1220a (a left side based on FIG. 1) on the cylinder body 1210, a second master piston 1230 provided in the second master chamber 1230a and provided to be displaced by a displacement of the first master piston 1220 or the liquid pressure of the pressurized medium accommodated in the first master chamber 1220a, and a pedal simulator 1240 disposed between the first master piston 1220 and the second master piston 1230, and providing the pedal feeling through elastic restoration force generated upon compression.

The first master chamber 1220a and the second master chamber 1230a may be sequentially formed inwards (the left side based on FIG. 1) from the brake pedal 10 (a right side based on FIG. 1) on the cylinder body 1210 of the integrated master cylinder 1200. Further, the first master piston 1220 and the second master piston 1230 are provided in the first master chamber 1220a and the second master chamber 1230a, respectively to form the liquid pressure or form a negative pressure in the pressurized medium accommodated in the each chamber with forward and backward movement.

The cylinder body 1210 may include a large diameter portion 1211 having the first master chamber 1220a therein, and having a relatively large inner diameter, and a small diameter portion 1212 having the second master chamber 1230a therein, and having a relatively smaller inner diameter than the large diameter portion 1211. The large diameter portion 1211 and the small diameter portion 1212 of the cylinder body 1210 may be integrally formed.

The first master chamber 1220a may be formed inside the large diameter portion 1211 which is an inlet or a rear side (the right side based on FIG. 1) of the cylinder body 1210, and the first master piston 1220 connected to the brake pedal 10 via an input rod 12 may be accommodated to reciprocate in the first master chamber 1220a.

The pressurized medium may be introduced into and discharged from the first master chamber 1220a through a first hydraulic port 1280a. The first hydraulic port 1280a is connected to a second reservoir path 1720 to be described below, so the pressurized medium may be introduced into the first master chamber 1220a from the reservoir 1100, or the pressurized medium accommodated in the first master chamber 1220a may be discharged to the reservoir 1100.

The first master piston 1220 may be provided to be accommodated in the first master chamber 1220a, and may move forward (a left direction based on FIG. 1) to press the pressurized medium accommodated in the first master chamber 1220a to form the liquid pressure, or may move backward (a right direction based on FIG. 1) to form the negative pressure inside the first master chamber 1220a. The first master piston 1220 may include a first body 1221 formed in a cylindrical shape to be in close contact with an inner peripheral surface of the first master chamber 1220a, and a first flange 1222 extended to a rear end (a right end based on FIG. 1) of the first body 1221 in a radius direction and connected to the input rod 12. The first master piston 1220 may be elastically supported by a first piston spring 1220b, and one end of the first piston spring 1220b may be provided to be supported on a front surface (a left surface based on FIG. 1) of the first flange 1222, and the other end may be provided to be supported on an outer surface of the cylinder body 1210.

A first sealing member 1290a sealing the first master chamber 1220a from the outside may be provided between an outer peripheral surface of the first master piston 1220 and the cylinder body 1210. The first sealing member 1290a is provided at an outermost side of the brake pedal on the inner peripheral surface of the cylinder body 1210, and seated on an accommodation groove recessed on the inner peripheral surface of the cylinder body 1210, and provided to be in contact with the outer peripheral surface of the first master piston 1220, so the first sealing member 1290a may prevent the pressurized medium accommodated in the first master chamber 1220a from being leaked to the outside, and at the same time, prevent external foreign materials from being introduced into the first master chamber 1220a.

The second master chamber 1230a may be formed inside the small diameter portion 1212 which is the inside or a front side (the left side based on FIG. 1) of the cylinder body 1210, and the second master piston 1230 may be accommodated to reciprocate in the second master chamber 1230a.

The pressurized medium may be introduced into and discharged from the second master chamber 1230a through a second hydraulic port 1280b and a third hydraulic port 1280c. The second hydraulic port 1280b may be connected to a first reservoir path 1710 to be described below, so the pressurized medium accommodated in the reservoir 1100 may be introduced into the second master chamber 1230a.

The second master piston 1230 is provided to be accommodated in the second master chamber 1230a, and moves forward to form the liquid pressure of the pressurized medium accommodated in the second master chamber 1230a and moves backward to form the negative pressure in the second master chamber 1230a. The second master piston 1230 may include a second body 1231 formed in the cylindrical shape to be in close contact with the inner peripheral surface of the second master chamber 1230a, and a second flange 1232 extended to a rear end (a right end based on FIG. 1) of the second body 1231 in a radius direction and disposed inside the first master chamber 1220a. A diameter of the second flange 1232 may be formed to be larger than a diameter of the inner peripheral surface of the second master chamber 1230a. The second master piston 1230 may be elastically supported by a second piston spring 1230b, and one end of the second piston spring 1230b may be provided to be supported on a front surface (a left surface based on FIG. 1) of the second body 1231, and the other end may be provided to be supported on an inner surface of the cylinder body 1210.

A second sealing member 1290b sealing the first master chamber 1220a to the second master chamber 1230a may be provided between an outer peripheral surface of the second master piston 1230 and the cylinder body 1210. The second sealing member 1290b may be seated on the accommodation groove recessed on the inner peripheral surface of the cylinder body 1210, and provided to be in contact with the outer peripheral surface of the second master piston 1230, and the second sealing member 1290b may prevent the pressurized medium accommodated in the first master chamber 1220a from being leaked to the second master chamber 1230a.

A cut-off hole 1230c is provided in the second master piston 1230, which is in communication with the second master chamber 1230a, and at the same time, which is in communication with the second hydraulic port 1280b and the first reservoir path 1710 in a non-operation state, that is, a ready state before displacement generation. Further, a third sealing member 1290c may be provided between the outer peripheral surface of the second master piston 1230 and the cylinder body 1210, which blocks a flow of the pressurized medium discharged from the second master chamber 1230a to the first reservoir path 1710 connected to the second hydraulic port 1280b. The third sealing member 1290c may be seated on an accommodation groove recessed at a front side (the left side based on FIG. 1) of the second hydraulic port 1280b on the inner peripheral surface of the cylinder body 1210, and may be in contact with the outer peripheral surface of the second master piston 1230. The third sealing member 1290c may be provided at a front side (the left side based on FIG. 1) of the second sealing member 1290b, and may allow the flow of the pressurized medium transmitted from the first reservoir path 1710 connected to the second hydraulic port 1280b to the second master chamber 1230a, and block the flow of the pressurized medium transmitted from the second master chamber 1230a to the second hydraulic port 1280b and the first reservoir path 1710.

A pedal simulator 1240 is provided between the first master piston 1220 and the second master piston 1230, and may provide the pedal feeling of the brake pedal 10 to the driver by the elastic restoration force thereof. Specifically, the pedal simulator 1240 may be interposed between a front surface of the first master piston 1220 and a rear surface of the second master piston 1230, and may be made of an elastic material such as rubber which is compressible and expandable. The pedal simulator 1240 may include a cylindrical body portion of which at least a part is inserted into and supported on the front surface of the first master piston 1220, and a taper portion of which at least a part is inserted into and supported on the rear surface of the second master piston 1230, and a diameter gradually decreases toward the front side (the left side based on FIG. 1). At least a part of each of both ends of the pedal simulator 1240 is inserted into the first master piston 1220 to be stably supported. Furthermore, the elastic restoration force is changed according to a pedal effort degree of the brake pedal 10 by the taper portion to provide a stable and familiar pedal feeling to the driver.

When a pedal simulation operation by the integrated master cylinder 1200 is described, the driver operates the brake pedal 10 in the normal operation mode, and at the same time, a cut valve 1610 provided in a backup path 1600 to be described below is closed. As the operation of the brake pedal 10 is conducted, the first master piston 1220 moves forward, but as the cut valve 1610 operates to be closed, the second master chamber 1230a is sealed, so the displacement is not generated in the second master piston 1230. At this time, the pressurized medium accommodated in the first master chamber 1220a is introduced along a second reservoir path 1720 to be described below. The second master piston 1230 does not move forward, while as the first master piston 1220 continuously moves forward, and thus, the pedal simulator 1240 is compressed, and the elastic restoration force of the pedal simulator 1240 may be provided to the driver as the pedal feeling. Thereafter, when the driver releases the pedal effort of the brake pedal 10, the first and second master pistons 1220 and 1230, and the pedal simulator 1240 return to an original shape and an original position by the elastic restoration force of the first and second piston springs 1220b and 1230b, and the pedal simulator 1240, and the pressurized medium may be supplied and filled into the first master chamber 1220a from the reservoir 1100 through the second reservoir path 1720.

As such, since the pressurized medium is filled in the first master chamber 1220a and the second master chamber 1230a, a friction between the first master piston 1220 and the second master piston 1230 is minimized when the pedal simulation operates to enhance the durability of the integrated master cylinder 1200 and block introduction of the foreign materials from the outside.

The reservoir 1100 may accommodate and store the pressurized medium therein. The reservoir 1100 is connected to the integrated master cylinder 1200, a liquid pressure supply device 1300 to be described below, and respective components such as a hydraulic circuit to be described below to supply or receive the pressurized medium.

The reservoir path 1700 is provided to connect the integrated master cylinder 1200 and the reservoir 1100.

The reservoir path 1700 may include a second reservoir path 1720 connecting the first master chamber 1220a and the reservoir 1100, and a first reservoir path 1710 connecting the second master chamber 1230a and the reservoir 1100. To this end, one end of the second reservoir path 1720 may be in communication with the first master chamber 1220a by the first hydraulic port 1280a of the integrated master cylinder 1200, and the other end may be in communication with the reservoir 1100, and one end of the first reservoir path 1710 may be in communication with the second master chamber 1230a by the second hydraulic port 1280b of the integrated master cylinder 1200, and the other end may be in communication with the reservoir 1100. Further, one end of the second reservoir path is in communication with the first master chamber 1220a by the first hydraulic port 1280a of the integrated master cylinder 1200, and the other end may also be connected to the first reservoir path 1710.

The liquid pressure supply device 1300 is provided to receive the braking will of the driver from the pedal displacement sensor sensing the displacement of the brake pedal 10 as the electric signal, and generate the liquid pressure of the pressurized medium through a mechanical operation.

The liquid pressure supply device 1300 may include a liquid pressure providing unit providing a pressurized medium pressure transmitted to the wheel cylinder 20, a motor (not illustrated) generating a rotational force by the electric signal of the pedal displacement sensor, and a power conversion unit (not illustrated) converting a rotary motion of the motor into a linear motion, and transmitting the linear motion to the liquid pressure providing unit.

The liquid pressure providing unit includes a cylinder block 1310 provided to accommodate the pressurized medium, a hydraulic piston 1320 accommodated in the cylinder block 1310, a sealing member 1350 provided between the hydraulic piston 1320 and the cylinder block 1310, and sealing pressure chambers 1330 and 1340, and a driving shaft 1390 transmitting a power output by the power conversion unit to the hydraulic piston 1320.

The pressure chambers 1330 and 1340 may include a first pressure chamber 1330 located at a front side (a left direction of the hydraulic piston 1320 based on FIG. 1) of the hydraulic piston 1320, and a second pressure chamber 1340 located at a rear side (a right direction of the hydraulic piston 1320 based on FIG. 1) of the hydraulic piston 1320. That is, the first pressure chamber 1330 is partitioned by the cylinder block 1310, and the front surface of the hydraulic piston 1320, and provided with a volume to vary according to the movement of the hydraulic piston 1320, and the second pressure chamber 1340 is partitioned by the cylinder block 1310 and the rear surface of the hydraulic piston 1320, and provided with the volume to vary according to the movement of the hydraulic piston 1320.

The first pressure chamber 1330 is connected to a first hydraulic path 1401 to be described below through a first communication hole 1360a formed in the cylinder block 1310, and the second pressure chamber 1340 is connected to a second hydraulic path 1402 to be described below through a second communication hole 1360b formed in the cylinder block 1310.

The sealing member includes a piston sealing member 1350a provided between the hydraulic piston 1320 and the cylinder block 1310, and sealing a space between the first pressure chamber 1330 and the second pressure chamber 1340, and a driving shaft sealing member 1350b provided between the driving shaft 1390 and the cylinder block 1310, and sealing an opening between the second pressure chamber 1340 and the cylinder block 1310. The liquid pressure or negative pressure of the first pressure chamber 1330 and the second pressure chamber 1340 generated by the forward movement or backward movement of the hydraulic piston 1320 may be sealed and not leaked by the piston sealing member 1350a and the driving shaft sealing member 1350b, but may be transmitted to a first hydraulic path 1401 and a second hydraulic path 1402 to be described below.

A motor (not illustrated) is provided to generate a driving force of the hydraulic piston 1320 by the electric signal output by the electronic control unit (ECU). The motor may be provided to include a stator and a rotor, and thus rotates in a forward direction or a reverse direction to provide power that generates a displacement of the hydraulic piston 1320. A rotational angular velocity and a rotational angle of the motor may be precisely controlled by a motor control sensor. The motor is already widely known technology, so a detailed description will be omitted.

The power conversion unit (not illustrated) is provided to convert the rotational force of the motor into the linear motion. As an example, the power conversion unit may be provided in a structure including a worm shaft (not illustrated), a worm wheel (not illustrated), and a driving shaft 1390.

The worm shaft may be formed integrally with the rotational shaft of the motor, and a worm is formed on an outer peripheral surface and coupled to engage with the work wheel to rotate the worm wheel. The worm wheel is connected to engage with the driving shaft 1390 to linearly move the driving shaft 1390, and the driving shaft 1390 is connected to the hydraulic piston 1320, and operates integrally with the hydraulic piston 1320, so the hydraulic piston 1320 may slide in the cylinder block 1310.

When the above operations are described again, when the displacement of the brake pedal 10 is sensed by the pedal displacement sensor, a sensed signal is transmitted to the electronic control unit, and the electronic control unit drives the motor to rotate the worm shaft in one direction. While the rotational force of the worm shaft is transmitted to the driving shaft 1390 through the worm wheel, and the hydraulic piston 1320 connected to the driving shaft 1390 moves forward in the cylinder block 1310, the liquid pressure may be generated to the first pressure chamber 1330.

On the contrary, when the pedal effort of the brake pedal 10 is released, the electronic control unit drives the motor to rotate the worm shaft in an opposite direction. Accordingly, while the worm wheel also rotates in the opposite direction, and the hydraulic piston 1320 connected to the driving shaft 1390 moves backward in the cylinder block 1310, the negative pressure may be generated in the first pressure chamber 1330.

The generation of the liquid pressure and the negative pressure of the second pressure chamber 1340 are operated in the opposite direction thereto, and implemented. That is, when the displacement of the brake pedal 10 is sensed by the pedal displacement sensor, a sensed signal is transmitted to the electronic control unit, and the electronic control unit drives the motor to rotate the worm shaft in the opposite direction. While the rotational force of the worm shaft is transmitted to the driving shaft 1390 through the worm wheel, and the hydraulic piston 1320 connected to the driving shaft 1390 moves backward in the cylinder block 1310, the liquid pressure may be generated to the second pressure chamber 1340.

On the contrary, when the pedal effort of the brake pedal 10 is released, the electronic control unit drives the motor in one direction to rotate the worm shaft in one direction. Accordingly, while the worm wheel also rotates in the opposite direction, and the hydraulic piston 1320 connected to the driving shaft 1390 moves forward in the cylinder block 1310, the negative pressure may be generated in the second pressure chamber 1340.

As such, in the liquid pressure supply device 1300, the liquid pressure may be generated or the negative pressure may be generated in each of the first pressure chamber 1330 and the second pressure chamber 1340 according to a rotational direction of the worm shaft by the driving of the motor, and whether to implement braking by transmitting the liquid pressure or whether to release braking by using the negative pressure may be determined by controlling valves. A detailed description thereof will be described below.

Meanwhile, when the power conversion unit according to the exemplary embodiment may convert the rotary motion of the motor into the linear motion of the hydraulic piston 1320, the power conversion unit is not limited to any one structure, and even when the power conversion unit is configured by devices of various structures and schemes, it should be appreciated that the power conversion units are the same.

The liquid pressure supply device 1300 may be hydraulically connected to the reservoir 1100 by a dump control unit 1800. The dump control unit is provided between the reservoir and the liquid pressure supply device to control the flow of the pressurized medium. The dump control unit 1800 may include a first dump control unit controlling the flow of the pressurized medium between the first pressure chamber 1330 and the reservoir 1100, and a second dump control unit controlling the flow of the pressurized medium between the second pressure chamber 1340 and the reservoir 1100. The first dump control unit may include a first dump path 1810 connecting the first pressure chamber 1330 and the reservoir 1100, and a first bypass path 1830 branched, and then rejoined on the first dump path 1810, and the second dump control unit may include a second dump path 1820 connecting the second pressure chamber 1340 and the reservoir 1100, and a second bypass path 1840 branched, and then rejoined on the second dump path 1820.

A first dump check valve 1811 and a first dump valve 1831 controlling the flow of the pressurized medium may be provided on the first dump path 1810 and the first bypass path 1830, respectively. The first dump check valve 1811 may be provided to allow only the flow of the pressurized medium toward the first pressure chamber 1330 from the reservoir 1100, and block the flow of the pressurized medium in an opposite direction. The first bypass path 1830 may be connected to the first dump path 1810 in parallel to the first dump check valve 1811, and the first dump valve 1831 controlling the flow of the pressurized medium between the first pressure chamber 1330 and the reservoir 1100 may be provided on the first bypass path 1830. In other words, the first bypass path 1830 may detour and connect a front end and a rear end of the first dump check valve 1811 on the first dump path 1810, and the first dump valve 1831 may be provided as a bidirectional solenoid valve that controls the flow of the pressurized medium between the first pressure chamber 1330 and the reservoir 1100. The first dump valve 1831 may be provided as a normal closed type solenoid valve which is in a closed state at normal times, and operates to be opened upon receiving the electric signal from the electronic control unit.

A second dump check valve 1821 and a second dump valve 1841 controlling the flow of the pressurized medium may be provided on the second dump path 1820 and the second bypass path 1840, respectively. The second dump check valve 1821 may be provided to allow only the flow of the pressurized medium toward the second pressure chamber 1330 from the reservoir 1100, and block the flow of the pressurized medium in the opposite direction. The second bypass path 1840 may be connected to the second dump path 1820 in parallel to the second dump check valve 1821, and the second dump valve 1841 controlling the flow of the pressurized medium between the second pressure chamber 1330 and the reservoir 1100 may be provided on the second bypass path 1840. In other words, the second bypass path 1840 may detour and connect a front end and a rear end of the second dump check valve 1821 on the second dump path 1820, and the second dump valve 1841 may be provided as a bidirectional solenoid valve that controls the flow of the pressurized medium between the second pressure chamber 1330 and the reservoir 1100. The second dump valve 1841 may be provided as a normal open type solenoid valve which is opened at normal times, and operates to be closed upon receiving the electric signal from the electronic control unit.

The hydraulic circuit may be provided to control the flow of the liquid pressure supplied to the wheel cylinder, and may include a first hydraulic circuit 1510 and a second hydraulic circuit 1520.

The first hydraulic circuit 1510 may control liquid pressures of first and second wheel cylinders 21 and 22 which are two wheel cylinders 20 among four vehicle wheels RR, RL, FR, and FL, and control liquid pressures of third and fourth wheel cylinders 23 and 24 which are two other wheel cylinders 20.

A connection path 1900 may be provided to connect the first hydraulic circuit 1510 and the second hydraulic circuit 1520 to each other. The connection path 1900 may be provided between a rear end of a hydraulic control device 1400 to be described below, and front ends of inlet valves 1511a, 1511b, 1521a, and 1521b of the first hydraulic circuit 1510 and the second hydraulic circuit 1520 to be described below. At this time, the connection path 1900 is connected to a hydraulic path of the hydraulic control device 1400 to transmit the pressurized medium provided by the liquid pressure supply device to the first hydraulic circuit 1510 or the second hydraulic circuit 1520, and further, the connection path 1900 is connected to a backup path 1600 to be described below to transmit the pressurized medium provided by the liquid pressure supply device 1300 to the first hydraulic circuit 1510 or the second hydraulic circuit 1520.

The first hydraulic circuit 1510 may receive or discharge the liquid pressure through the connection path 1900. To this end, as illustrated in FIG. 1, the first hydraulic circuit-side connection path 1900 may be provided to be branched into two paths connected to the first wheel cylinder 21 and the second wheel cylinder 22. In addition, the second hydraulic circuit 1520 may receive or discharge the liquid pressure through the connection path 1900. To this end, as illustrated in FIG. 1, the second hydraulic circuit-side connection path 1900 may be provided to be branched into two paths connected to the third wheel cylinder 23 and the fourth wheel cylinder 24.

The first and second hydraulic circuits 1510 and 1520 may include at least one inlet valve to control the flow of the pressurized medium and the liquid pressure transmitted to the first to fourth wheel cylinders 21, 22, 23, and 24, and specifically, the first and second hydraulic circuits 1510 and 1520 may include first to fourth inlet valves 1511*a* and 1511*b*, and 1521*a* and 1521*b*, respectively. The first to fourth inlet valves 1511*a*, 1511*b*, 1521*a*, and 1521*b* may be disposed upstream of the first to fourth wheel cylinders 21, 22, 23, and 24, respectively, and provided as normal open type solenoid valves that are opened in normal times and operate to be closed upon receiving an electric signal from the electronic control unit.

The first and second hydraulic circuits 1510 and 1520 may include first to fourth check valves 1513*a*, 1513*b*, 1523*a*, and 1523*b* provided to be connected in parallel to the first to fourth inlet valves 1511*a*, 1511*b*, 1521*a*, and 1521*b*. The check valves 1513*a*, 1513*b*, 1523*a*, and 1523*b* may be provided on the bypass path connecting the front and rear sides of the first to fourth inlet valves 1511*a*, 1511*b*, 1521*a*, and 1521*b* on the first and second hydraulic circuits 1510 and 1520, and allow only the flow of the pressurized medium from the respective wheel cylinders 20 toward the liquid pressure supply device 1300 and block the flow of the pressurized medium toward the wheel cylinders 20 from the liquid pressure supply device 1300. The liquid pressure of the pressurized medium applied to the respective wheel cylinders 20 may be quickly removed by the first to fourth check valves 1513*a*, 1513*b*, 1523*a*, and 1523*b*, and even when the first to fourth inlet valves 1511*a*, 1511*b*, 1521*a*, and 1521*b* do not operate normally, the liquid pressure of the pressurized medium applied to the wheel cylinders 20 may be smoothly returned toward the liquid pressure providing unit.

The first and second hydraulic circuits 1510 and 1520 may include at least one outlet valve to control the flow of the pressurized medium discharged from the first to fourth wheel cylinders 21, 22, 23, and 24 for performance enhancement upon releasing braking of the first to fourth wheel cylinders 21, 22, 23, and 24, and specifically, the first and second hydraulic circuits 1510 and 1520 may include first to fourth outlet valves 1512*a* and 1512*b*, and 1521*a* and 1522*b*, respectively. The first to fourth outlet valves 1512*a* and 1512*b*, and 1521*a* and 1522*b* are provided at discharge sides of the first to fourth wheel cylinders 21, 22, 23, and 24, respectively to control the flow of the pressurized medium transmitted from the first to fourth wheel cylinders 21, 22, 23, and 24 to the reservoir 1100. The first to fourth outlet valves 1512*a* and 1512*b*, and 1521*a* and 1522*b* may be provided as normal closed type solenoid valves which are in a closed state at normal times, and operate to be opened upon receiving the electric signal from the electronic control unit. The first to fourth outlet valves 1512*a* and 1512*b*, and 1521*a* and 1522*b* may selectively release the liquid pressure of the pressurized medium applied to the first wheel cylinder 23 and the fourth wheel cylinder 22, and transmit the liquid pressure to the reservoir 1100 in an ABS braking mode of the vehicle.

The hydraulic control device 1400 may be provided between the liquid pressure supply device, and the first and second hydraulic circuits 1510 and 1520, and provided to control the liquid pressure transmitted to the respective wheel cylinders 20. The hydraulic control device may include multiple paths and valves to control the liquid pressure transmitted from the liquid pressure supply device 1300 to the wheel cylinder 20, and the electronic control unit (ECU) may be provided to control the liquid pressure supply device 1300 and various valves based on liquid pressure information and pedal displacement information.

The first hydraulic path 1401 may be provided to connect the first pressure chamber 1330 and the connection path 1900 to be in communication with the first pressure chamber 1330, and the second hydraulic path 1402 may be provided to connect the second pressure chamber 1340 and the connection path 1900 to be in communication with the second pressure chamber 1340.

The third hydraulic path 1403 may be provided so that one end is connected to the first hydraulic path 1401 and the other end is connected to the second hydraulic path 1402 so that the first hydraulic path 1401 and the second hydraulic path 1402 are in communication with each other, and the fourth hydraulic path 1404 may be provided to connect the third hydraulic path 1403 and the connection path 1900 so that the first hydraulic path 1401 and the second hydraulic path 1402 are joined on the third hydraulic path 1403, and then are in communication with the connection path 1900.

A first valve 1411 controlling the flow of the pressurized medium may be provided in the first hydraulic path 1401. The first valve 1411 may be provided as a check valve which allows only the flow of the pressurized medium discharged from the first pressure chamber 1330, and blocks the flow of the pressurized medium in an opposite direction. Further, a second valve 1412 controlling the flow of the pressurized medium may be provided in the second hydraulic path 1402, and the second valve 1412 may be provided as a check valve which allows the flow of the pressurized medium discharged from the second pressure chamber 1340, and blocks the flow of the pressurized medium in the opposite direction.

A third valve 1413 and a fourth valve 1414 controlling the flow of the pressurized medium may be provided in the third hydraulic path 1403. The third valve 1413 may be provided in the third hydraulic path 1403, and provided between one end and a connection point of the fourth hydraulic path 1404, and the fourth valve 1414 may be provided in the third hydraulic path 1403, and provided between the other end and the connection point of the fourth hydraulic path 1404. The third valve 1413 and the fourth valve 1414 may be provided as a bidirectional control valve that controls the flow of the pressurized medium transmitted along the third hydraulic path 1403. The third valve 1413 and the fourth valve 1414 may be provided as the normal closed type solenoid valve which is in the closed state at normal times, and operates to be opened upon receiving the electric signal from the electronic control unit.

In the hydraulic control device 1400, the liquid pressure formed in the first pressure chamber 1330 as the hydraulic piston 1320 moves forward by the placement of the hydraulic paths and the valves may be transmitted to the first hydraulic circuit 1510 and the second hydraulic circuit 1520 sequentially via the first hydraulic path 1401 and the connection path 1900. Further, the liquid pressure formed in the second pressure chamber 1340 as the hydraulic piston 1320 moves backward may be transmitted to the first hydraulic circuit 1510 and the second hydraulic circuit 1520 sequentially via the second hydraulic path 1402 and the connection path 1900.

On the contrary, the negative pressure formed in the first pressure chamber 1330 as the hydraulic piston 1320 moves backward may recover the pressurized medium provided to the first hydraulic circuit 1510 to the first pressure chamber 1330 sequentially via the first hydraulic path 1401 and the connection path 1900, and recover the pressurized medium provided to the second hydraulic circuit 1520 to the first pressure chamber 1330 sequentially via the second hydraulic path 1402 and the connection path 1900. Further, the negative pressure formed in the second pressure chamber 1340 as the hydraulic piston 1320 moves forward may recover the pressurized medium provided to the first hydraulic circuit 1510 to the first pressure chamber 1340 sequentially via the first hydraulic path 1401 and the connection path 1900, and recover the pressurized medium provided to the second hydraulic circuit 1520 to the second pressure chamber 1340 sequentially via the second hydraulic path 1402 and the connection path 1900.

However, the connection of the hydraulic path illustrated in FIG. 1 is an example for helping understanding of the present disclosure and is not limited to this structure, and the connection should be appreciated similarly even when the connection is performed in various schemes and structures in which an additional hydraulic path is provided between the first hydraulic path 1401 and the second hydraulic path 1402 to be connected to another hydraulic path, or other valves are provided on the hydraulic path.

The electric brake system 1000 according to the first exemplary embodiment of the present disclosure may include a backup path 1600 to implement braking by directly supplying the pressurized medium discharged from the integrated master cylinder 1200 to the wheel cylinder 20 when a normal operation is impossible by a failure of the device, etc. A mode in which the liquid pressure of the integrated master cylinder 1200 is directly transmitted to the wheel cylinder 20 is referred to as an abnormal operation mode, that is, a fallback mode.

The backup path 1600 may be singly provided to be connected to any one of master chambers 1220a and 1230a of the integrated master cylinder 1200, and the first and second hydraulic circuits 1510 and 1520.

At least one cut valve 1610 controlling a bidirectional flow of the pressurized medium may be provided in the backup path 1600. The cut valve 1610 may be provided as the normal open type solenoid valve which is opened at normal times, and operates to be closed upon receiving a close signal from the electronic control unit. When the cut valve 1610 is closed, the pressurized medium of the integrated master cylinder 1200 may be prevented from being directly transmitted to the wheel cylinder 20, and at the same time, the liquid pressure provided from the liquid pressure supply device 1300 may be prevented from being leaked to the integrated master cylinder 1200. Further, when the cut valve 1610 is opened, the pressurized medium pressurized by the integrated master cylinder 1200 is directly supplied to the first and second hydraulic circuits 1510 and 1520 through the backup path 1600 to implement braking.

One end of the backup path 1600 may be connected to the master chambers 1220a and 1230a, and the other end may be connected to any one of the first and second hydraulic circuits 1510 and 1520. Specifically, as illustrated in FIG. 1, one end of the backup path 1600 may be connected to the second master chamber 1230a, and the other end of the backup path 1600 may be in communication with the connection path 1900. At this time, the other end of the backup path 1600 may be in direct communication with the connection path 1900 without intervention of a valve.

In FIG. 1, it is illustrated that the backup path 1600 is connected onto the connection path 1900 connecting the first hydraulic path 1401 and the first hydraulic circuit 1510, but the present disclosure is not limited thereto, and when the backup path 1600 is connected to any one point on the connection path 1900 like the backup path 1600 being connected onto the connection path 1900 connecting the second hydraulic path 1402 and the second hydraulic circuit 1520, this case should be appreciated similarly.

As such, even though the backup path 1600 is singly provided, the pressurized media accommodated in the master chambers 1220a and 1230a of the integrated master cylinder may be made to be in communication with the first hydraulic circuit 1510 and the second hydraulic circuit 1520, and furthermore, the pressurized media may be made to be in communication with the first to fourth wheel cylinders 21, 22, 23, and 24, so the braking may be implemented and cost may be reduced by a simple structure and a simple operation.

The electric brake system 1000 may include a circuit pressure sensor PS1 sensing the liquid pressure of the pressurized medium provided by the liquid pressure supply device 1300, and a cylinder pressure sensor PS2 sensing the liquid pressure of the second master chamber 1230a. The circuit pressure sensor PS1 is provided at the hydraulic circuit to sense the liquid pressure of the pressurized medium accommodated in the hydraulic circuit, and the cylinder pressure sensor PS2 is provided between the second master chamber 1230a and the cut valve 1610 on the backup path 1600 to sense the liquid pressure of the pressurized medium accommodated in the second master chamber 1230a.

The electric brake system 1000 may include a sensor that senses a water level of the pressurized medium accommodated in the reservoir 1100. Accordingly, the sensor (not illustrated) senses leakage of a liquid amount of the pressurized medium to simply diagnose whether pressurized media to be accommodated in and be in communication with components are leaked to the outside.

Hereinafter, an operation method of the electric brake system 1000 according to a first exemplary embodiment of the present disclosure will be described.

The electric brake system 1000 according to the first exemplary embodiment of the present disclosure may include a normal operation mode in which the electric brake system 1000 operates normally with no failure or abnormality of various components to perform braking, and an abnormal operation mode (fallback mode) in which the electric brake system 1000 performs braking of the vehicle emergently in a state in which a failure or abnormality occurs in a brake system.

Hereinafter, the normal operation mode of the electric brake system 1000 according to the first exemplary embodiment of the present disclosure will be described.

The normal operation mode of the electric brake system 1000 according to the first exemplary embodiment of the present disclosure may operate separately in first to third braking modes as the liquid pressure transmitted from the liquid pressure supply device 1300 to the wheel cylinder 20 increases. Specifically, the first braking mode primarily provides the liquid pressure by the liquid pressure supply device 1300 to the wheel cylinder 20, the second braking mode secondarily provides the liquid pressure by the liquid pressure supply device 1300 to the wheel cylinder 20 to transmit a higher braking pressure than the first braking mode, and the third braking mode tertiarily provides the liquid pressure by the liquid pressure supply device 1300 to the wheel cylinder 20 to transmit a higher braking pressure than the second braking mode.

The first to third braking modes may be changed by differentiating the operations of the liquid pressure supply device 1300 and the hydraulic control device 1400. The liquid pressure supply device 1300 may provide a sufficiently high liquid pressure of the pressurized medium without a high-specification motor by using the first to third braking modes, and furthermore, prevent an unnecessary load applied to the motor. As a result, a stable braking force may be ensured while reducing a cost and a weight of the brake system, and the durability and operation reliability of the device may be enhanced.

Figure 2:
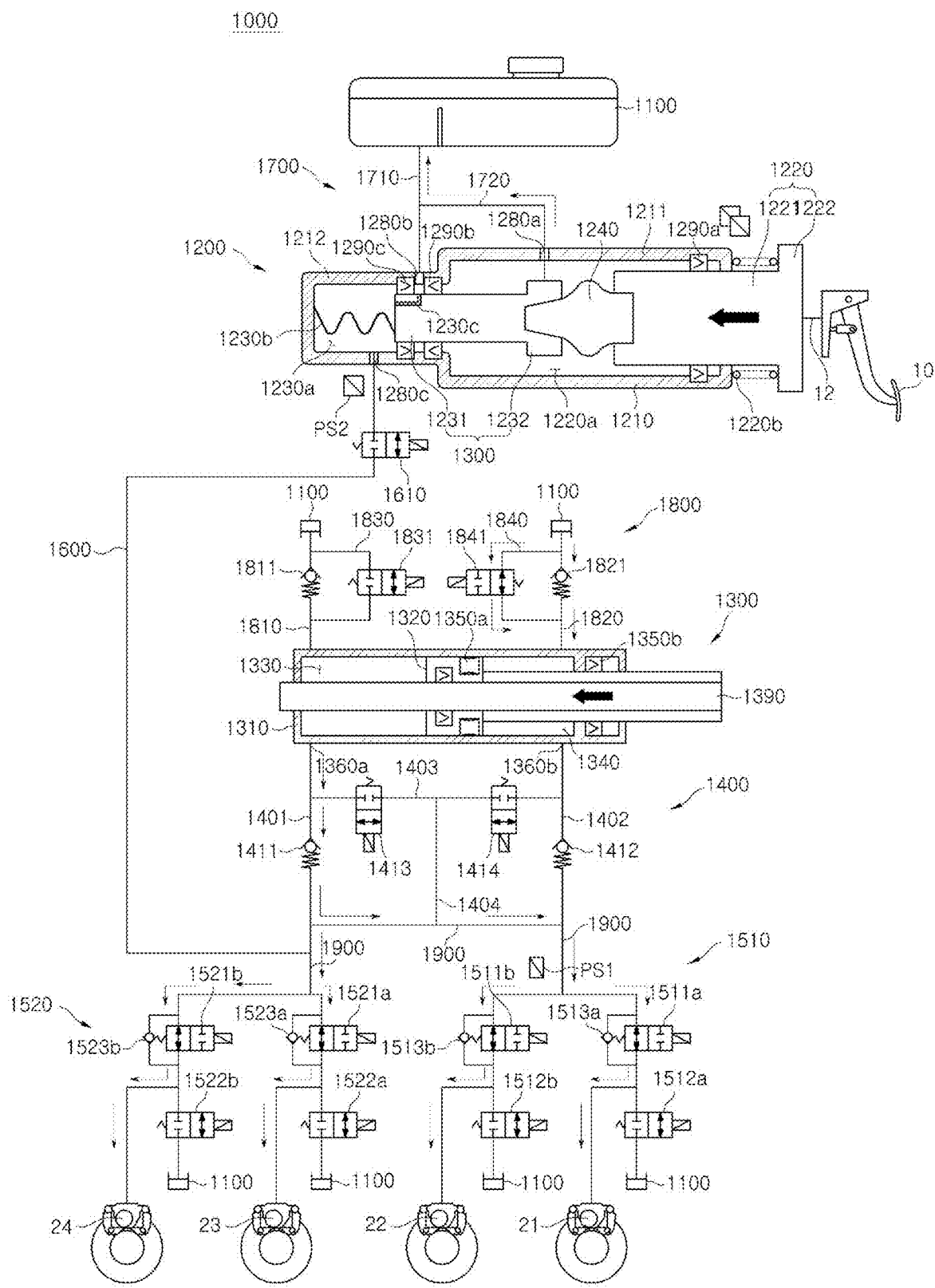
FIG. 2 is a hydraulic circuit diagram illustrating a state in which the electric brake system according to the first exemplary embodiment of the present disclosure performs a first baking mode.

FIG. 2 is a hydraulic circuit diagram illustrating a state in which the electric brake system 1000 according to the first exemplary embodiment of the present disclosure performs a first baking mode.

Referring to FIG. 2, when the driver steps on a brake pedal 10 in an initial braking stage, a motor (not illustrated) operates to rotate in one direction, and a rotational force of the motor is transmitted to the liquid pressure providing unit by the power conversion unit, and the hydraulic piston 1320 of the liquid pressure providing unit generates the liquid pressure in the first pressure chamber 1330 while moving forward. The liquid pressure discharged from the first pressure chamber 1330 is transmitted to each wheel cylinder 20 via the hydraulic control device 1400, the first hydraulic circuit 1510, and the second hydraulic circuit 1520 to generate a braking force.

Specifically, the liquid pressure of the pressurized medium formed in the first pressure chamber 1330 is primarily transmitted to the first and second wheel cylinders provided in the first hydraulic circuit 1510 and the second hydraulic circuit by sequentially passing through the first hydraulic path 1401 and the connection path 1900. At this time, the first valve 1411 is provided as a check valve that allows only the flow of the pressurized medium discharged from the first pressure chamber 1330, so the liquid pressure of the pressurized medium may be smoothly transmitted to the first to fourth wheel cylinders 21, 22, 23, and 24. Further, the first to fourth inlet valves provided in the first hydraulic circuit and the second hydraulic circuit are maintained in the opened state, and the cut valve 1610 is maintained in the closed state to prevent the liquid pressure of the pressurized medium from being leaked to the backup path 1600.

In the first braking mode, the third valve 1413 and the fourth valve 1414 are controlled in the closed state to prevent the liquid pressure of the pressurized medium formed in the first pressure chamber 1330 from being leaked to the second pressure chamber 1340. Further, the first dump valve 1831 provided in the first bypass path 1830 is maintained in the closed state to prevent the liquid pressure formed in the first pressure chamber 1330 from being leaked to the reservoir 1100.

Meanwhile, as the hydraulic piston 1320 moves forward, the negative pressure is generated in the second pressure chamber 1340, and the liquid pressure of the pressurized medium is transmitted to the second pressure chamber 1340 from the reservoir 1100 through the second dump path 1820 to prepare a second braking mode to be described below. The second dump check valve 1821 provided in the second dump path 1820 allows the flow of the pressurized medium toward the second pressure chamber 1340 from the reservoir 1100, so the pressurized medium may be stably supplied to the second pressure chamber 1340, and the first dump valve 1841 provided in the second bypass path 1840 is switched to the opened state to rapidly supply the pressurized medium from the reservoir 1100 to the first pressure chamber 1330.

In the first braking mode of implementing the braking of the wheel cylinder 20 by the liquid pressure supply device 1300, the cut valve 1610 provided in the backup path 1600 is switched to the closed state, so the pressurized medium discharged from the integrated master cylinder 1200 is prevented from being transmitted to the wheel cylinder 20.

Specifically, at the same time when the driver operates the brake pedal 10, the cut valve 1610 provided in the backup path 1600 to be described below is closed. As the operation of the brake pedal 10 is conducted, the first master piston 1220 moves forward, but as the cut valve 1610 operates to be closed, the second master chamber 1230a is sealed, so the displacement is not generated in the second master piston 1230. The second master piston 1230 does not move forward, while as the first master piston 1220 continuously moves forward, the pedal simulator 1240 is compressed, and the elastic restoration force of the pedal simulator 1240 may be provided to the driver as the pedal feeling.

Figure 3:
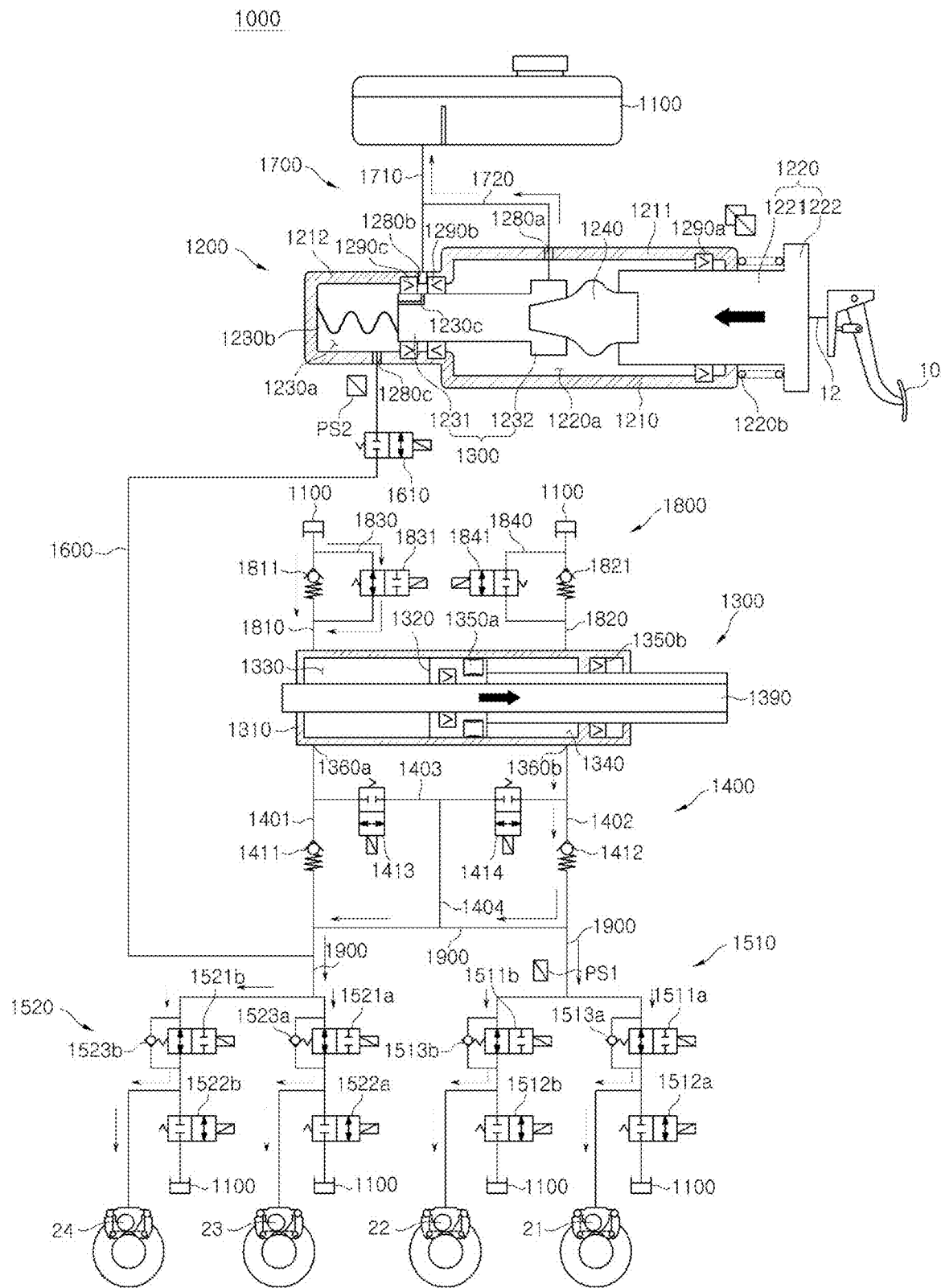
FIG. 3 is a hydraulic circuit diagram illustrating a state in which the electric brake system according to the first exemplary embodiment of the present disclosure performs a second baking mode.

In the electric brake system 1000 according to the first exemplary embodiment of the present disclosure, when a higher braking pressure than the first braking mode should be provided, the first braking mode may be switched to the second braking mode illustrated in FIG. 3.

FIG. 3 is a hydraulic circuit diagram illustrating a state in which the electric brake system 1000 according to the first exemplary embodiment of the present disclosure performs a second baking mode, and referring to FIG. 3, the electronic control unit determines that a higher braking pressure is required to switch the first braking mode to the second braking mode when a displacement or an operating speed of the brake pedal 10 sensed by the pedal displacement sensor is higher than a predetermined level, or a liquid pressure sensed by a pressure sensor is higher than a predetermined level.

When the first braking mode is switched to the second braking mode, the motor operates to rotate in the other direction, and a rotational force of the motor is transmitted to the liquid pressure providing unit by the power conversion unit, so the hydraulic piston 1320 moves backward to generate the liquid pressure in the second pressure chamber 1340. The liquid pressure discharged from the second pressure chamber 1340 is transmitted to each wheel cylinder 20 via the hydraulic control device 1400, the first hydraulic circuit 1510, and the second hydraulic circuit 1520 to generate the braking force.

Specifically, the liquid pressure formed in the second pressure chamber 1340 is secondarily transmitted to the first to fourth wheel cylinders 21, 22, 23, and 24 provided in the first hydraulic circuit 1510 and the second hydraulic circuit by sequentially passing through the second hydraulic path 1402 and the connection path 1900. At this time, the second valve 1412 provided in the second hydraulic path 1402 is provided as a check valve that allows only the flow of the pressurized medium discharged from the second pressure chamber 1340, so the liquid pressure of the pressurized medium may be smoothly transmitted to the first to fourth wheel cylinders 21, 22, 23, and 24. The first to fourth inlet valves 1511b provided in the first hydraulic circuit 1510 and the second hydraulic circuit are maintained in the opened state, and the cut valve 1610 is maintained in the closed state to prevent the liquid pressure of the pressurized medium from being leaked to the backup path 1600.

In the second braking mode, the third valve 1413 and the fourth valve 1414 are controlled in the closed state to prevent the liquid pressure of the pressurized medium formed in the second pressure chamber 1340 from being leaked to the first pressure chamber 1330. Further, the second dump valve 1841 is switched to the closed state to prevent the liquid pressure of the pressurized medium formed in the second pressure chamber 1340 from being leaked to the reservoir 1100.

Meanwhile, as the hydraulic piston 1320 moves backward, the negative pressure is generated in the first pressure chamber 1330, and the liquid pressure of the pressurized medium is transmitted to the first pressure chamber 1330 from the reservoir 1100 through the first dump path 1810 to prepare a third braking mode to be described below. The first dump check valve 1811 provided in the first dump path 1810 allows the flow of the pressurized medium toward the first pressure chamber 1330 from the reservoir 1100, so the pressurized medium may be stably supplied to the first pressure chamber 1330, and the first dump valve 1831 provided in the first bypass path 1830 is switched to the opened state to rapidly supply the pressurized medium from the reservoir 1100 to the first pressure chamber 1330.

The operation of the integrated master cylinder 1200 in the second braking mode is the same as the operation of the integrated master cylinder 1200 in the first braking mode of the electric brake system described above, so a description thereof will be omitted in order to prevent the duplication of contents.

Figure 4:
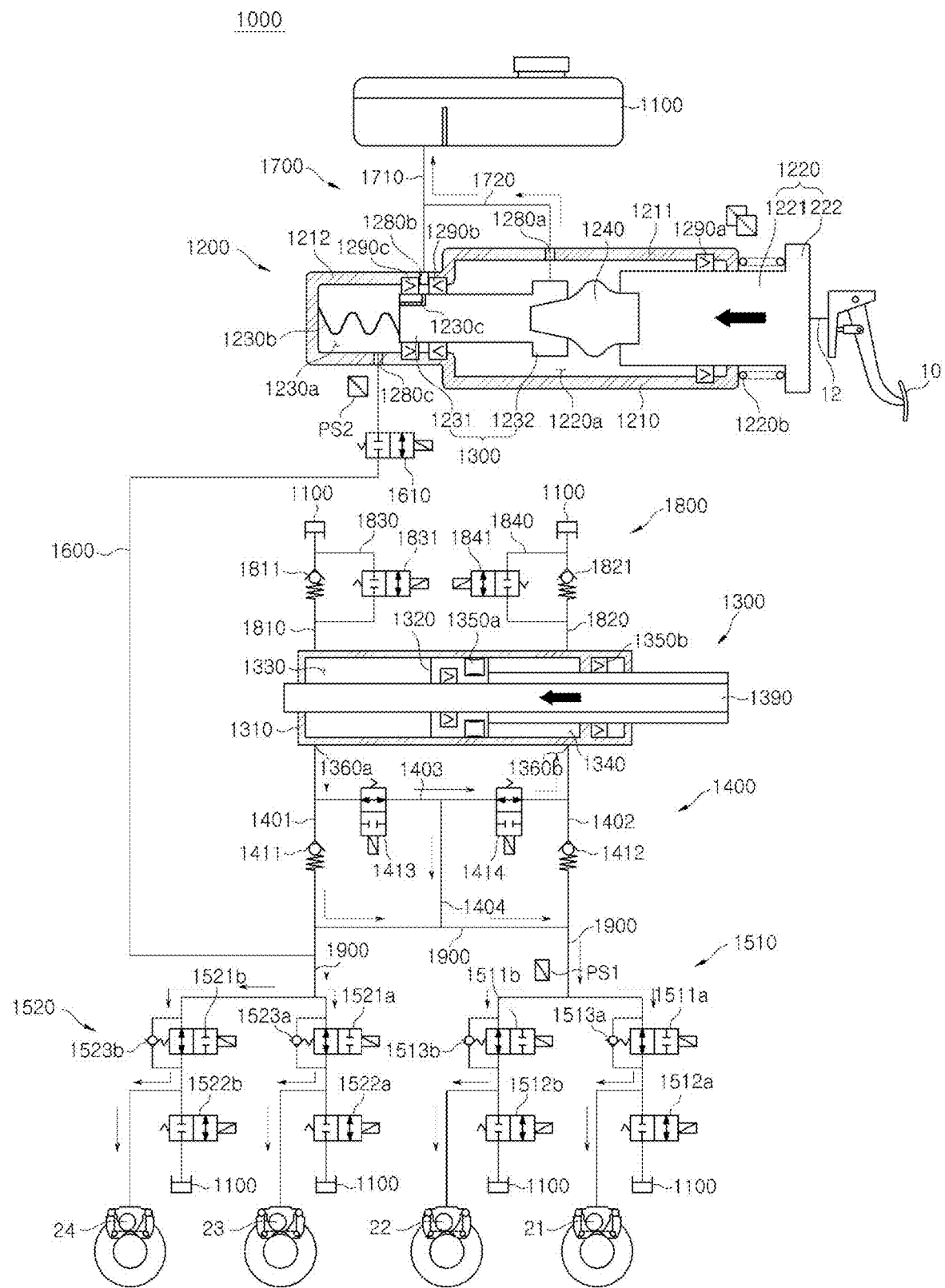
FIG. 4 is a hydraulic circuit diagram illustrating a state in which the electric brake system according to the first exemplary embodiment of the present disclosure performs a third baking mode.

In the electric brake system 1000 according to the first exemplary embodiment of the present disclosure, when a higher braking pressure than the second braking mode should be provided, the second braking mode may be switched to the third braking mode illustrated in FIG. 4.

FIG. 4 is a hydraulic circuit diagram illustrating a state in which the electric brake system 1000 according to the first exemplary embodiment of the present disclosure performs a third baking mode. Referring to FIG. 4, the electronic control unit determines that a higher braking pressure is required to switch the second braking mode to the third braking mode when a displacement or an operating speed of the brake pedal 10 sensed by the pedal displacement sensor is higher than a predetermined level, or a liquid pressure sensed by a pressure sensor is higher than a predetermined level.

When the second braking mode is switched to the third braking mode, a motor (not illustrated) operates to rotate in one direction, and a rotational force of the motor is transmitted to the liquid pressure providing unit by the power conversion unit, so the hydraulic piston 1320 of the liquid pressure providing unit moves forward again to generate the liquid pressure in the first pressure chamber 1330. The liquid pressure discharged from the first pressure chamber 1330 is transmitted to each wheel cylinder 20 via the hydraulic control device 3400, the first hydraulic circuit 1510, and the second hydraulic circuit 1520 to generate the braking force.

Specifically, a part of the liquid pressure formed in the first pressure chamber 1330 is primarily transmitted to the first to fourth wheel cylinders 21, 22, 23, and 24 provided in the first hydraulic circuit and the second hydraulic circuit by sequentially passing through the first hydraulic path 1401 and the connection path 1900. At this time, the first valve 1411 is provided as a check valve that allows only the flow of the pressurized medium discharged from the first pressure chamber 1330, so the liquid pressure of the pressurized medium may be smoothly transmitted to the first to fourth wheel cylinders 21, 22, 23, and 24. Further, the first to fourth inlet valves 1511*b* provided in the first hydraulic circuit 1510 and the second hydraulic circuit are maintained in the opened state, and the cut valve 1610 is maintained in the closed state to prevent the liquid pressure of the pressurized medium from being leaked to the backup path 1600.

Meanwhile, since the third braking mode is in a state in which a high liquid pressure is provided, a force at which the liquid pressure in the first pressure chamber 1330 moves the hydraulic piston 1320 backward also increases as the hydraulic piston 1320 moves forward, so a load applied to the motor rapidly increases. Therefore, in the third braking mode, the third valve 1413 and the fourth valve 1414 operate to be opened to allow the flow of the pressurized medium through the third hydraulic path 1403 and the fourth hydraulic path 1404. In other words, the remaining part of the liquid pressure formed in the first pressure chamber 1330 may be supplied to the second pressure chamber 1340 by sequentially passing through the first hydraulic path 1401 and the third hydraulic path 1403, and through this, the first pressure chamber 1330 and the second pressure chamber 1340 are in communication with each other to synchronize the liquid pressure, so the load applied to the motor may be reduced, and the durability and reliability of the device may be enhanced.

In the third braking mode, the first dump valve 1831 is switched to the closed state to prevent the liquid pressure of the pressurized medium formed in the first pressure chamber 1330 from being leaked to the reservoir 1100 along the first bypass path 1830, and the second dump valve 1841 is also controlled in the closed state, so the negative pressure is rapidly formed in the second pressure chamber 1340 with forward movement of the hydraulic piston 1320 to smoothly receive the pressurized medium provided from the first pressure chamber 1330.

The operation of the integrated master cylinder 1200 in the third braking mode is the same as the operation of the integrated master cylinder 1200 in the first braking mode and the second braking mode of the electric brake system described above, so a description thereof will be omitted in order to prevent the duplication of contents.

Hereinafter, a case where the electric brake system 1000 according to the first exemplary embodiment of the present disclosure does not normally operate, that is, an operation state of a fallback mode will be described.

Figure 5:
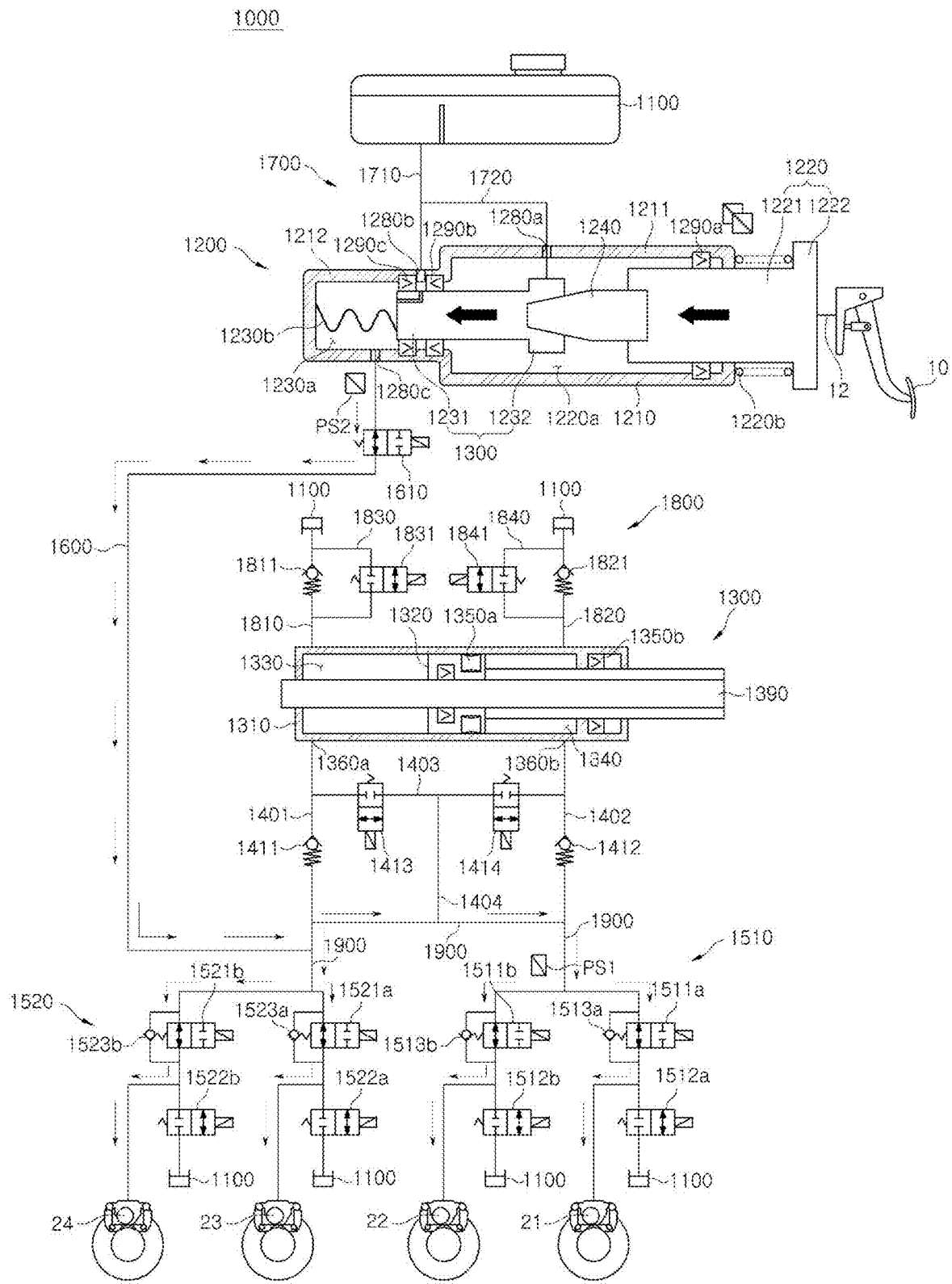
FIG. 5 is a hydraulic circuit diagram illustrating a state in which the electric brake system according to the first exemplary embodiment of the present disclosure performs an abnormal operation model (fallback mode)

FIG. 5 is a hydraulic circuit diagram illustrating an operation state in an abnormal operation mode (fallback mode) when a normal operation of the electric brake system 1000 according to the first exemplary embodiment of the present disclosure is impossible due to a failure of a device, etc.

Referring to FIG. 5, respective valves in an abnormal operation mode are controlled in an initial braking state which is a non-operation state. At this time, when the driver applies a pedal effort to the brake pedal 10, the first master piston 1220 and the second master piston 1230 connected to the brake pedal 10 move forward to generate a displacement. Since the cut valve 1610 is provided in the opened state in the non-operation state, the pressurized medium accommodated in the second master chamber is transmitted to the first to fourth wheel cylinders 21, 22, 23, and 24 of the first and second hydraulic circuits via the backup path 1600 and the connection path 1900 to implement braking.

Hereinafter, an electric brake system 2000 according to a second exemplary embodiment of the present disclosure will be described.

Figure 6:
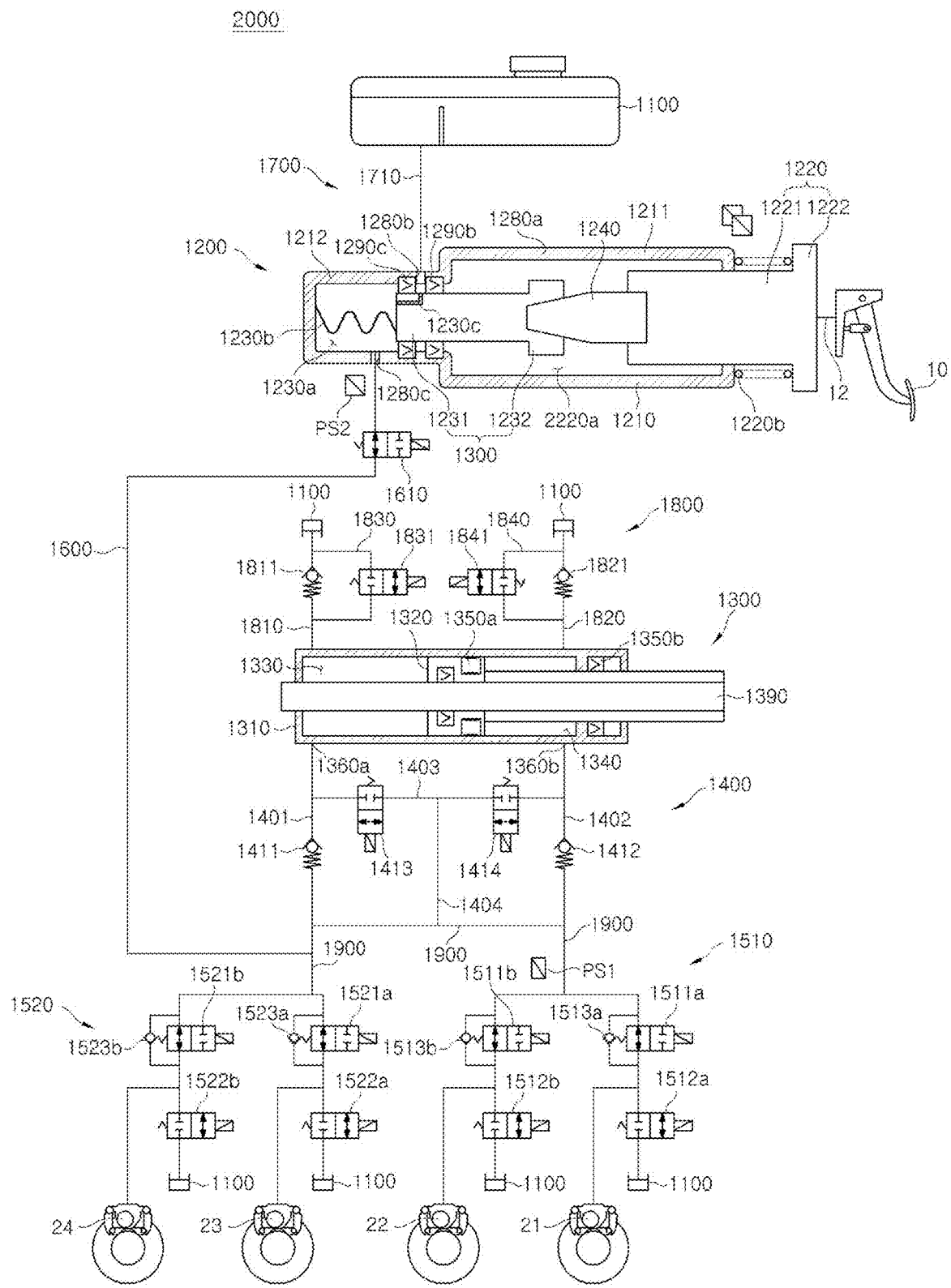
FIG. 6 is a hydraulic circuit diagram of an electric brake system according to a second exemplary embodiment of the present disclosure.

FIG. 6 is a hydraulic circuit diagram illustrating an electric brake system 2000 according to a second exemplary embodiment of the present disclosure, and referring to FIG. 6, unlike the first exemplary embodiment, in the electric brake system 2000 according to the second exemplary embodiment, the second reservoir path 1720 is omitted which communicates the reservoir 1100 and the first master chamber with each other, and the first sealing member 1290*a* is omitted which seals the first master chamber 1220*a* from the outside.

Except for a case where separate reference numerals are additionally described in the description of the electric brake system 2000 according to the second exemplary embodiment of the present disclosure described below, the remaining description is the same as the electric brake system 1000 according to the first exemplary embodiment of the present disclosure described above, so the description is omitted in order to prevent the duplication of contents.

The pressurized medium may be accommodated in the first master chamber 1220a, so the electric brake system according to the first exemplary embodiment of the present disclosure is provided to operate as a wet type, while the electric brake system according to the second exemplary embodiment is provided to operate as a dry type in which the pressurized medium is not accommodated in the first master chamber 2220a. Accordingly, compared to the first exemplary embodiment, in the electric brake system according to the second exemplary embodiment, the components such as the second reservoir path 1720 and the first sealing member 1290a may be omitted, so the braking may be implemented by a simpler structure and a simpler operation, and cost reduction may be achieved.

As described above, although the present disclosure has been described with limited exemplary embodiments and drawings, the present disclosure is not limited thereto, and of course, various modifications and variations can be made by those skilled in the art in the technical field to which the present disclosure belongs within the scope of equivalency of the technical idea of the present disclosure and the scope of the patent claims described below.

What is claimed is:

1. An electric brake system comprising:
   a reservoir storing a pressurized medium;
   an integrated master cylinder including a master piston connected to a brake pedal, a master chamber of which a volume is varied by a displacement of the master piston, and a pedal simulator providing a pedal feeling in contact with the master piston;
   a liquid pressure supply device generating a liquid pressure by operating a hydraulic piston by an electric signal output in response to a displacement of the brake pedal;
   a first hydraulic circuit controlling a flow of a pressurized medium supplied to a first wheel cylinder and a second wheel cylinder;
   a second hydraulic circuit controlling the flow of the pressurized medium supplied to a third wheel cylinder and a fourth wheel cylinder;
   a single backup path of which one end is connected to the master chamber, and the other end is connected to any one of the first and second hydraulic circuits;
   a cut valve provided in the backup path and controlling the flow of the pressurized medium; and
   a connection path connecting the first hydraulic circuit and the second hydraulic circuit to each other,
   wherein the connection path and the other end of the backup path are in communication with each other.

2. The electric brake system according to claim 1, wherein the connection path and the other end of the backup path are in direct communication with each other without intervention of a valve.

3. The electric brake system according to claim 2, wherein the integrated master cylinder includes a first master piston connected to the brake pedal, a second master piston provided to be displaceable by a displacement of the first master piston, a first master chamber of which volume is varied by the displacement of the first master piston, and a second master chamber of which volume is varied by a displacement of the second master piston, and the one end of the backup path is connected to the second master chamber.

4. The electric brake system according to claim 3, wherein the pedal simulator is provided between the first master piston and the second master piston.

5. The electric brake system according to claim 2, further comprising:
   a hydraulic control device provided between the liquid pressure supply device, and the first and second hydraulic circuits, and controlling the flow of the pressurized medium,
   wherein each of the first hydraulic circuit and the second hydraulic circuit includes at least one inlet valve controlling the flow of the pressurized medium transmitted to at least any one of the first to fourth wheel cylinders, and
   the connection path is provided between a rear end of the hydraulic control device and a front end of the inlet valve.

6. The electric brake system according to claim 5, wherein the liquid pressure supply device includes a first pressure chamber provided at a front side of the hydraulic piston, and a second pressure chamber provided at a rear side of the hydraulic piston, and
   the hydraulic control device includes a first hydraulic path connecting the first pressure chamber and the connection path, a second hydraulic path connecting the second pressure chamber and the connection path, a third hydraulic path of which one end is connected to the first hydraulic path and the other end is connected to the second hydraulic path, and a fourth hydraulic path connecting the third hydraulic path and the connection path.

7. The electric brake system according to claim 6, wherein the hydraulic control device includes a first valve provided in the first hydraulic path and controlling the flow of the pressurized medium, a second valve provided in the second hydraulic path and controlling the flow of the pressurized medium, a third valve provided in the third hydraulic path, and provided between one end and a connection point of the fourth hydraulic path, and a fourth valve provided in the third hydraulic path, and provided between the other end and the connection point of the fourth hydraulic path.

8. The electric brake system according to claim 7, wherein the first valve is provided as a check valve that allows only the flow of the pressurized medium discharged from the first pressure chamber,
   the second valve is provided as a check valve that allows only the flow of the pressurized medium discharged from the second pressure chamber, and
   the third valve and the fourth valve are provided as a solenoid valve that controls a bidirectional flow of the pressurized medium.

9. The electric brake system according to claim 3, further comprising:
   a first reservoir path connecting the reservoir and the second master chamber.

10. The electric brake system according to claim 3, wherein the first master chamber is provided as a dry type in which the pressurized medium is not accommodated.

11. The electric brake system according to claim 9, further comprising:
    a second reservoir path connecting the reservoir and the first master chamber.

12. The electric brake system according to claim 1, further comprising:

a sensor sensing a water level of the pressurized medium accommodated in the reservoir.

13. The electric brake system according to claim 6, further comprising:
a dump control unit provided between the reservoir and the liquid pressure supply device, and controlling the flow of the pressurized medium.

14. The electric brake system according to claim 13, wherein the dump control unit includes a first dump control unit controlling the flow of the pressurized medium between the first pressure chamber and the reservoir, and a second dump control unit controlling the flow of the pressurized medium between the second pressure chamber and the reservoir.

15. The electric brake system according to claim 14, wherein the first dump control unit includes a first dump path connecting the first pressure chamber and the reservoir, and a first bypass path branched, and then rejoined on the first dump path, and
the second dump control unit includes a second dump path connecting the second pressure chamber and the reservoir, and a second bypass path branched, and then rejoined on the second dump path.

16. An operation method of an electric brake system according to claim 7, wherein a normal operation mode includes a first braking mode of primarily providing the liquid pressure, a second braking mode of secondarily providing the liquid pressure, and a third braking mode of tertiarily providing the liquid pressure, as the liquid pressure of the pressurized medium transmitted from the liquid pressure supply device to the wheel cylinder gradually increases.

17. The operation method of the electric brake system according to claim 16, wherein in the first braking mode, the hydraulic piston moves forward to transmit the pressurized medium accommodated in the first pressure chamber to the first to fourth wheel cylinders.

18. The operation method of the electric brake system according to claim 17, wherein in the second braking mode, the hydraulic piston moves backward to transmit the pressurized medium accommodated in the second pressure chamber to the first to fourth wheel cylinders.

19. The operation method of the electric brake system according to claim 18, wherein in the third braking mode, the third valve and the fourth valve are opened, and the hydraulic piston moves forward again, and some pressurized medium of the first pressure chamber is transmitted to the first to fourth wheel cylinders, and the remaining pressurized medium of the first pressure chamber is transmitted to the second pressure chamber.

20. The operation method of the electric brake system according to claim 16, further comprising:
a fallback mode switched when braking by the liquid pressure supply device is impossible,
wherein in the fallback mode, the pressurized medium discharged from the integrated master cylinder is transmitted to all of the first to fourth wheel cylinders via the backup path and the connection path.

* * * * *